United States Patent [19]

Wenner

[11] 3,961,370
[45] June 1, 1976

[54] RAPID ACCESS STORAGE DEVICE

[75] Inventor: John William Wenner, Boulder, Colo.

[73] Assignee: International Business Machines Corporation, Armonk, N.Y.

[22] Filed: Dec. 20, 1974

[21] Appl. No.: 534,973

[52] U.S. Cl. ................................ 360/93; 360/132; 242/55.19 A
[51] Int. Cl.² .................. G11B 23/04; G11B 15/58; G11B 5/78
[58] Field of Search ................ 360/93, 92, 88, 132; 242/55.19 A, 55.19 R, 55.18, 55.17; 226/95, 97, 113

[56] References Cited
UNITED STATES PATENTS

| | | | |
|---|---|---|---|
| 2,482,428 | 9/1949 | Miller | 242/15 |
| 3,121,863 | 2/1964 | Lovell | 360/84 |
| 3,352,506 | 11/1967 | Bodrov et al. | 242/55.18 |
| 3,588,377 | 6/1971 | Meyer | 360/132 |
| 3,619,625 | 11/1971 | Wood | 360/93 |
| 3,773,272 | 11/1973 | Wallace | 242/55.19 A |
| 3,782,662 | 1/1974 | Miller | 242/55.19 R |

*Primary Examiner*—Alfred H. Eddleman
*Attorney, Agent, or Firm*—Joscelyn G. Cockburn; Francis A. Sirr

[57] ABSTRACT

A cartridge containing a single tape reel is inserted into a rapid access tape storage device. The cartridge comprises a tapered-wall vacuum column and a friction surface disposed opposite the vacuum column. When the tape is acted upon by the restraining force of the frictional surface, said restraining force being transferred by an endless intermediate belt which loosely encircles the tape, the outer bale of tape is restrained. Reel rotation causes the reel layers to quickly transfer either away from the hub or toward the hub dependent on the direction of reel rotation. By applying a vacuum to the vacuum column, the tape is disengaged from the influence of the frictional surface and the separation widens adjacent to the vacuum column. A magnetic transducer is then inserted into the separation and data processing occurs with the transducer engaging the exposed magnetic layer of tape near the reel hub.

33 Claims, 9 Drawing Figures

RAPID ACCESS STORAGE DEVICE

BACKGROUND OF THE INVENTION

I. Field of the Invention

The present invention relates to the field of magnetic tape units which selectively moves magnetic tape and are utilized to both write and read digital data. Such tape units are of two general types. In the first type, the tape moves between a replaceable file reel and a machine reel. In the second type, only one reel is utilized, the tape leaving the reel, passing through a tape processing station, and returning to the reel as an endless loop. The present invention relates to this second type of tape unit.

II. Prior Art

The single-spool type tape unit or single-reel type tape unit within a cartridge is well known in the prior art. Although these tape units have taken a variety of configuration, the basic configuration comprises an endless length of magnetic tape. The combination of tape and hub is called a single-reel or a single-spool tape unit.

Although the prior art single-spool tape units are appropriate for their intended purpose, these units have several drawbacks. One of these drawbacks is that the prior art single-spool tape unit must pass through a complicated tortuous path before returning to the tape reel and before information can be processed at a processing station. The tape must be fed from the inside surface and returned to the outside surface of the tape reel. The tape cannot be reversed or rewound. Normally one must run through the entire reel in order to return to the beginning of the tape.

Probably, the most significant drawback with the prior art single-reel tape units is that these units cannot be operated in rapid access mode to obtain desired information which is located at a given address on the reel in a minimum amount of time. This means that with the prior art devices that the entire reel must be processed serially to the location of the desired information. As such, if the desired information is located midway on the reel, the prior art unit cannot rapidly locate the desired information.

The net result of the above drawbacks is that the access time of the prior art tape unit is relatively long. As is well known to those skilled in the art, the emphasis in data processing technology is to design tape units having relatively short access time. As such the prior art tape units are not suitable for use in an environment where rapid accessing is required.

OBJECTS OF THE INVENTION

It is, therefore, an object of this invention to process information in a more efficient and improved manner than was heretofor possible.

It is another object of this invention to rapid access a desired location on a single-reel tape unit.

It is still another object of the invention to minimize the accessing time of a single-reel magnetic tape unit.

It is still a further object of the invention to rapid access a desired location on a single-reel tape unit and then proceed to process information sequentially.

SUMMARY OF THE INVENTION

The present invention overcomes the drawbacks found in the prior art by means of a unique structural combination of a single flange tape reel contained within a tape cartridge. The tape cartridge comprises a tapered-shaped vacuum column and a stationary frictional surface positioned opposite to said tapered vacuum column. The tape on the tape reel is encircled by a loosely fitted endless belt. The endless belt functions to establish a fundamental band of tape. By allowing the tape to be acted upon by the frictional surface via the intermediate endless belt and simultaneously rotating the reel hub, layers of tape are rapidly transferred from an inner bale to an outer bale, thereby rapidly accessing a layer which was formerly contained within the inner bale.

When a vacuum is applied to the vacuum column, the reel is disengaged from the influence of the frictional surface and the space between inner and outer bales is skewed towards the vacuum column. Both the inner bale and the outer bale are now driven as a single unit. The skewed space provides an opening in which a magnetic transducer is inserted for reading or writing data in a sequential mode.

Another feature of the invention provides a means for applying a tangential force against the exposed edge of the tape so as to force the opposite edge of the tape against the reel flange. This maneuver results in creating frictional force between the reel flange and the tape's edge which for the most part provides the force driving the outer and inner bales as a single unit for sequential transfer of the tape.

Another feature of the invention provides constant guiding of the tape edge against the reel flange by providing sufficient tangential force to the opposite edge of tape. The reel flange is in turn located by a reference surface.

In another feature of the invention, sensing means is provided for sensing the space between the outer and inner bales of tape to locate the proper layer for insertion of the magnetic transducer.

In another feature of the invention, sensing means is provided for sensing the presence or absence of the layer of tape connecting the outer and inner bales in the space between bales, opposite the magnetic transducer. This insures that the space is clear prior to insertion to of the magnetic transducer.

Another feature of the invention is directed to means for positioning the magnetic transducer in a horizontal or a vertical plane, the horizontal and vertical planes having perpendicular relationship.

Another feature of the invention is a means for obtaining constant force between the recording surface of the tape and the magnetic transducer. Because of the geometric relationship and the force transducer feedback system, this relationship is maintained.

The foregoing and other objects, features, and advantages of the invention will be apparent from the following more particular description of preferred embodiment of the invention, as illustrated in the accompanying drawings.

DETAILED DESCRIPTION OF THE PREFERRED EMBODIMENT

Figure 1:
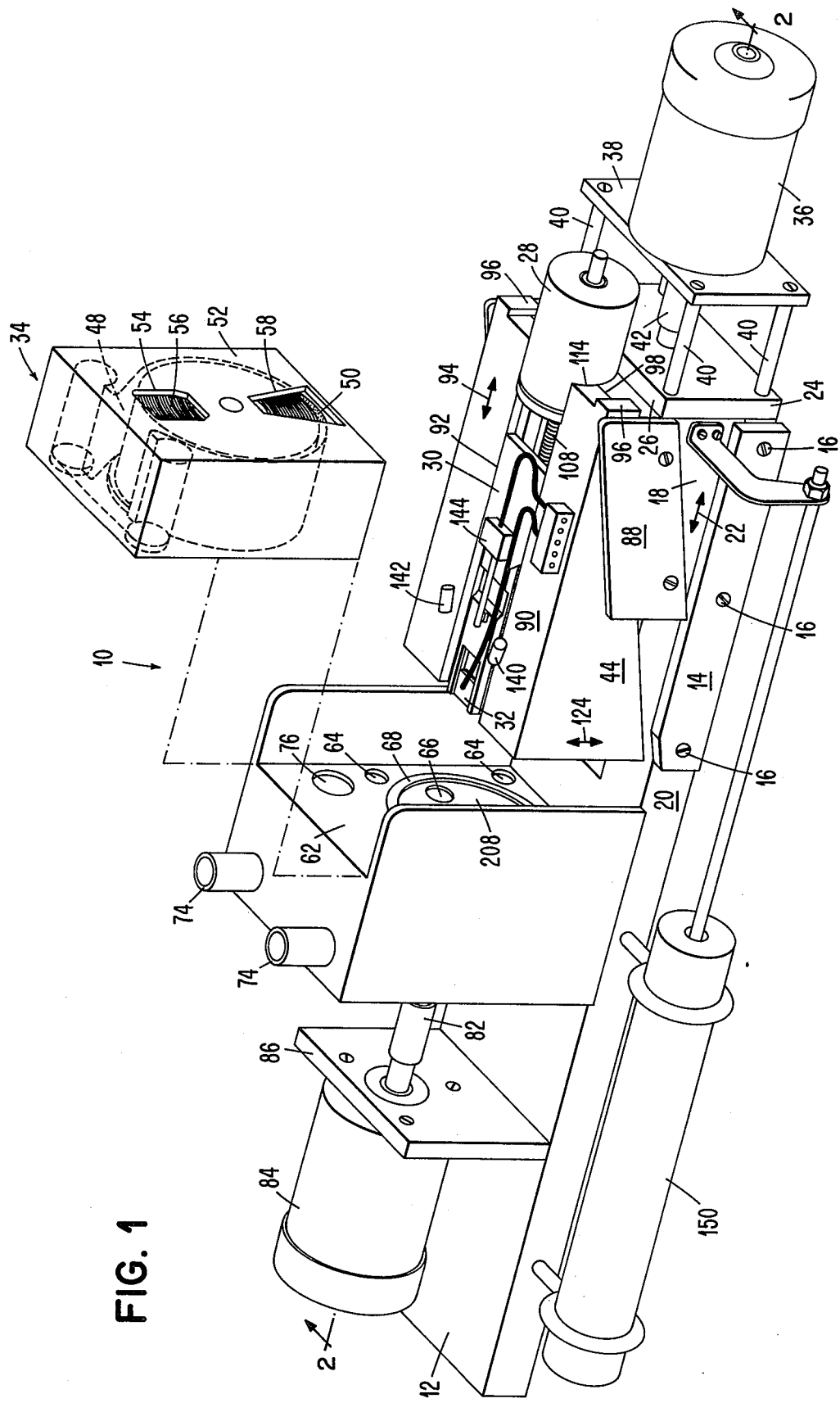
FIG. 1 is a perspective view of the magnetic tape unit of the present invention, showing the cartridge with the tape reel displaced from the drive hub and reference plate of the tape transport unit.

Referring to FIG. 1, a pictorial view of the preferred tape transport unit 10 is shown. Tape transport unit 10 has a generally flat support frame 12. Rectangular guide rail 14 is attached to support frame 12 by screws 16. As will be explained subsequently, head horizontal means 18 travels along the upper surface 20 in the horizontal direction depicted by arrow 22. As such, the purpose of guide rail 14 is to guide head horizontal means 18 as it travels to and fro along its horizontal path. End plate 24 is attached to support frame 12. The upper edge 26 of end plate 24 has a semicircular portion removed so as to accommodate head stepping motor 28. As will be explained subsequently, head stepping motor 28 is the drive means for track positioning of head assembly 30 so that magnetic transducer 32 hereinafter called head 32 can access cartridge 34 for processing information. The term "processing information" means that magnetic head 32 is either reading or writing data on the surface of the magnetic media within cartridge 34.

Head position motor 36 is supported by frame support plate 38 which is connected by spacer rods 40 to end plate 24. As will be described subsequently, head position motor 36 is coupled by coupler 42 to head horizontal means 18. Head position motor 36 is a D.C. reversible drive motor. Therefore, by energizing head position motor 36, head horizontal means 18 can be positioned either forward or backward along arrow 22. As such, horizontal positioning is imparted to head vertical means 44 and head assembly 30.

Still referring to FIG. 1, cartridge processing station 46 is attached to support frame 12. The function of cartridge processing station 46 is to support cartridge 34 so that head 32 can access the magnetic media contained on the reel within cartridge 34 for the processing of information. Cartridge 34 is shown disposed from its functional position in processing station 46. As can be seen, cartridge 34 is a rectangular-shaped cartridge with a tapered-wall vacuum column 48 disposed on the top side of the cartridge. On the bottom side of cartridge 34, opposite tapered-wall vacuum column 48, is frictional surface 50. Frictional surface 50 may be any frictional material which is affixed to the lower inside of the cartridge. The front side 52 of cartridge 34 has top cartridge opening 54. The function of top cartridge opening 54 is to allow head 32 to enter the cartridge and process data on the magnetic surface of media 56. In order to effectuate information processing, a space is formed between the outer and inner bales of magnetic media 56 and head 32 is inserted. A more detailed description of the process which is used to form the space will be described subsequently. Diagonally across from top cartridge opening 54 and on front side 52 of cartridge 34 is tapered shape opening 58. The function of tapered shape opening 58 is to allow tapered roller 60, (See FIG. 2 and FIG. 3) hereinafter referred to as second force means 60, to apply pressure to the edge of magnetic media 56.

Figure 2:
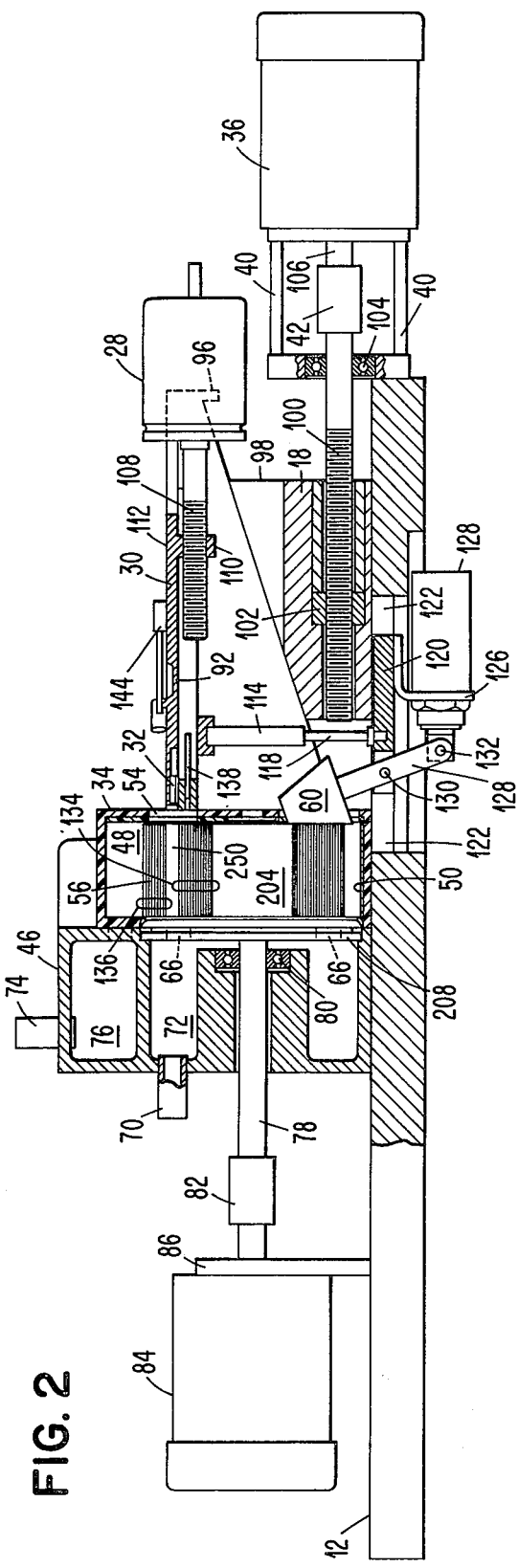
FIG. 2 is a side section view of the unit of FIG. 1 with cartridge inserted taken along the line 2—2 of FIG. 1.
Figure 5:
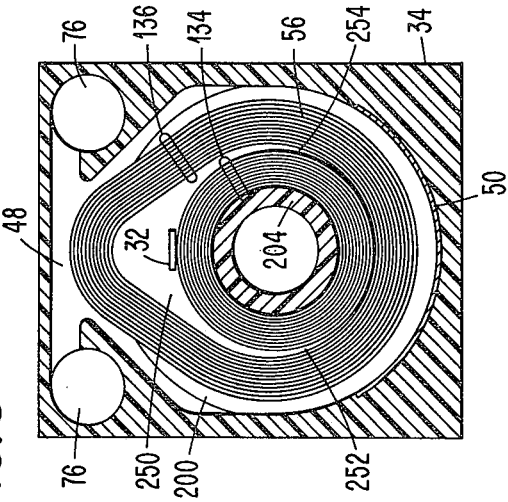
FIG. 5 is a break-away view of the cartridge showing the configuration of the tape on the reel in sequential access mode.
Figure 6:
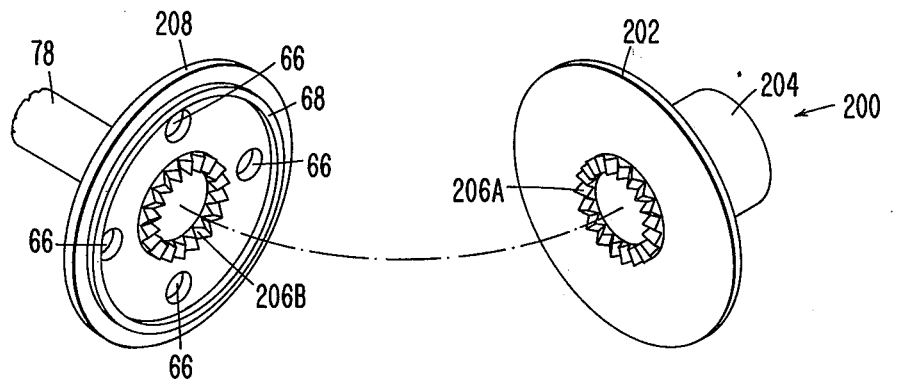
FIG. 6 shows the drive hub and reel flange with gearing for rotating the reel.

Referring to FIGS. 2, 4, 6 and 9, a diagrammatic view of magnetic media 56 is shown. In FIG. 6, reel 200 with reel flange 202 and reel hub 204 with magnetic media 56 removed is shown. In FIG. 2 cartridge 34 is cut open showing a side view of reel 200 with magnetic media 56 thereon. Reel 200 holds approximately 120 feet of ½ inch magnetic tape 56, hereinafter called magnetic media 56, and normally containing plural tracks of digital data. It should be noted that the description of reel 200 is only explanatory and should not be construed as a limitation on the scope of the invention. For example, the length of magnetic media 56 may be more than 120 feet dependent on the total thickness of the media. Similarly, the length of magnetic media 56 may be relatively less than 120 feet. Also, the width of magnetic media 56 may be relatively less or relatively more than ½ inch. Reel 200 has circular reel flange 202. Reel flange 202 is chamfered at an approximately 45° angle circumferentially (see FIG. 2). A hole (not shown) which has a diameter relatively larger than the diameter of reel flange 202 is cut into the back side, i.e., side opposite side 52 of cartridge 34. Also, the circumference of the hole is chamfered around the circumference so as to enable the flange 202 to fit snugly and slightly inside the back side of cartridge 34. Magnetic media 56 is wound upon reel hub 204 in a manner so that the magnetic surface which is used for writing or reading data is positioned away from the central axis of reel hub 204. As will be explained subsequently and as shown in FIG. 5, when head 32 is processing data from magnetic media 56, it is positioned to be in contact with the magnetic surface of the inner bale of magnetic media that is wound on rotating reel hub 204.

Figure 7:
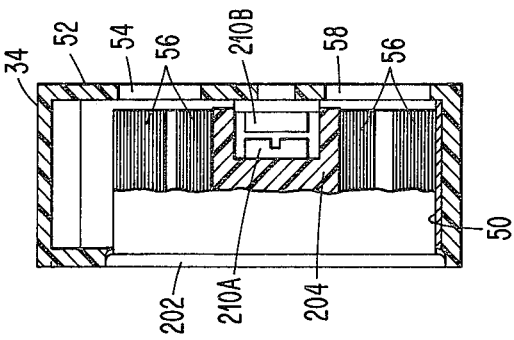
FIG. 7 shows the lock mechanism which locks the tape cartridge when the cartridge is not in the tape transport unit.

Referring to FIG. 6 on the back surface of reel flange 202 is one section of mating gear 206A. The other section of mating gear 206B is located on the central section of drive hub 208. As will be explained subsequently, both sections of mating gear 206 cooperate so as to rotate reel 200. Recessed on the front side of reel hub 204 is magnet 210A (FIG. 7). Magnet 210A cooperates with keeper 210B which is located on the inner surface of cartridge 34. This magnet and keeper are hereinafter referred to as cartridge locking means. As such, there is a mutual attraction resulting in a force which locks reel 200 into stationary position when cartridge 34 is removed from tape transport unit 10.

Referring now to FIG. 1 and FIG. 2, cartridge processing station 46 supports cartridge 34 with reel 200 so as the enable head 32 to access opening 54 for the processing of information on magnetic media 56. Cartridge processing station 46 comprises reference plate 62. Reference plate 62 has a plurality of vacuum ports 64. Drive hub 208 is positioned in the central section of reference plate 62. A plurality of vacuum ports 66 are positioned on drive hub 208. Drive hub 208 has annular flange 68 which guides reel flange 202 and also prevents the escape of pressure from vacuum ports 66. As was stated previously, the central section of drive hub 208 has one section of mating gear 206B which cooperates with reel 200. Vacuum inlet 70 is associated with vacuum chamber 72 and supplies a vacuum to ports 66 and 64. A similar vacuum system is described in U.S. Pat. No. 3,666,202, issued to John W. Wenner, the inventor of the present invention, and assigned to International Business Machines Corporation, Assignee of the present invention. Vacuum inlet 74 is associated with vacuum chamber 76 and supplies vacuum to tapered-wall vacuum column 48, hereinafter referred to as stationary vacuum means 48, of cartridge 34. Vacuum inlet 74 has a solenoid valve (not shown) which controls the vacuum to vacuum column 48. As will be explained subsequently, when the vacuum to stationary vacuum means 48 is on, tape transport unit 10 is operating in the sequential mode. Drive hub 208 is attached to shaft 78. Shaft 78 is journaled between bearing 80 and coupled through coupling means 82 to reversible reel drive D.C. motor 84, hereinafter called reel drive means 84. Reel drive means 84 is supported by support plate 86 which is affixed to frame 12. Reel drive means 84 is a reversible motor; that is, reel drive means 84 can rotate drive hub 208 either clockwise or counterclockwise depending on the polarity of the control signal which is applied to activate reel drive means 84. The relationship between the surface of drive hub 208 and reference plate 62 is such that the surface of drive hub 208 is in the same vertical plane.

With this configuration, when cartridge 34 is placed in position on reference plate 62, reel flange 202 is pulled slightly out of cartridge 34 and is seated on drive hub 208. Annular flange 68 of drive hub 208 aligns and guides reel flange 202, i.e., flange 68 prevents reel flange 202 from lateral movements. As part of the seating process, mating gears 206A and 206B cooperate so as to rotate reel 200. As vacuum port 64 is covered by the back surface of cartridge 34 and the vacuum-to-vacuum chamber 72 is up, cartridge 34 is pulled against reference plate 62. Thus, any lateral movement of cartridge 34 is prevented. Simultaneously, the vacuum from vacuum port 66 pulls reel flange 202 in an axial direction away from cartridge 34. This action enables reel flange 202 to clear the back surface of cartridge 34 by approximately 0.030 inches. Also, the pulling force which is applied to reel flange 202 from vacuum ports 66 pulls magnet 210A from keeper 210B thereby releasing the magnetic latch and allowing reel 202 to rotate freely in a clockwise or counterclockwise direction.

Figure 3:
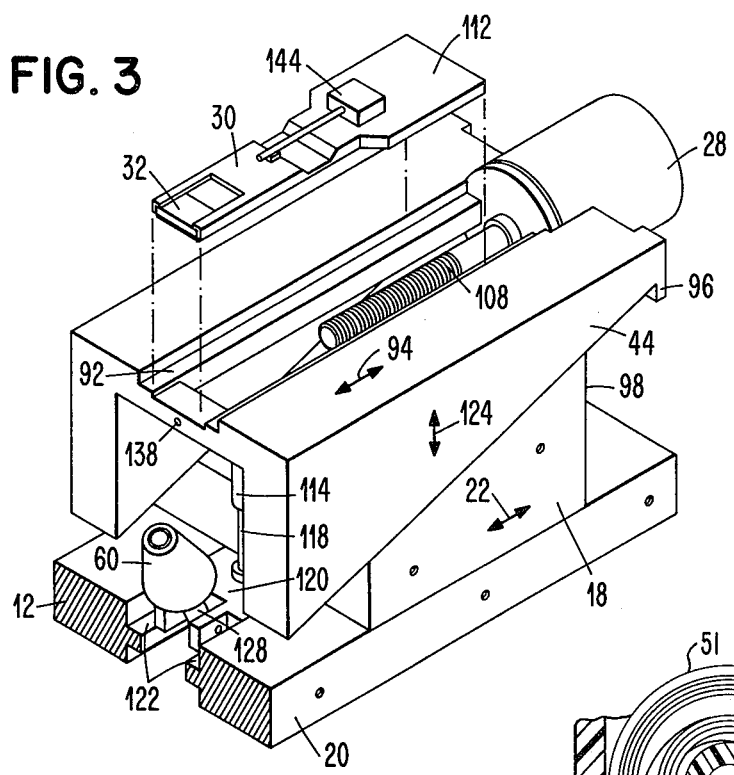
FIG. 3 is a view of the magnetic transducer assembly and positioning means which position the magnetic transducer assembly.
Figure 9:
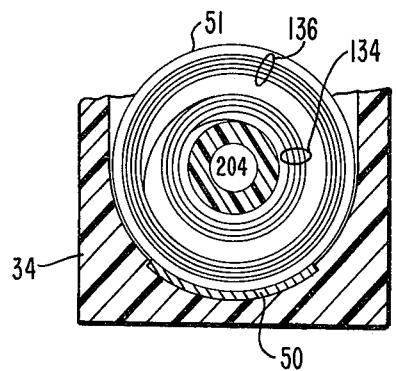
FIG. 9 is a diagrammatic view of the tape reel encircled by an endless loose belt.

Referring now to FIG. 1, FIG. 2, and FIG. 3, when cartridge 34 is seated on reference plate 62, head horizontal means 18 cooperates with head vertical means 44 to position head assembly 30 so that head 32 can access magnetic media 56 for processing data. The head horizontal means 18 is a wedged-shaped piece and is positioned on support frame 12 so that the small tapered end of the wedge faces front side 52 of cartridge 34. Guide rail 88 is attached to head horizontal means 18 and guides head vertical means 44 as head horizontal means 18 travels horizontally along support frame 12 in the direction of arrow 22. Head vertical means 44 is a hollow wedge shaped piece. The upper surface 90 is machined to form channel 92. Head assembly 30 is cantilevered in channel 92 and is free to move in the horizontal direction of arrow 94. The relationship between head horizontal means 18 and head vertical means 44 is critical to the proper operation of tape transport unit 10. For explanation purposes, the large end of head horizontal means 18 and head vertical means 44 is called "head"; while the small end of head horizontal means 18 and head vertical means 44 is called "tail". With this definition, head vertical means 44 and head horizontal means 18 are aligned in a head and tail position with the slant surface of the wedge of head horizontal means 18 in contact with the slant surface of head vertical means 44. On the edge of the tail of head vertical means 44 is ledge stop 96. As shown in FIG. 1, the head of head horizontal means 18 is in alignment with the tail of head vertical means 44, i.e., the back side 98 of head horizontal means 18 is resting firmly against ledge stop 96. Semicircle 114 is machined into head horizontal means 18 with clearance and head vertical means 44 to fit, thus providing a seat for head stepping motor 28. As head horizontal means 18 travels horizontally away from cartridge 34, the top of back side 98 of head horizontal means 18 contacts ledge stop 96 and pulls head vertical means 44 and head assembly 30 away from cartridge 34. In order to position head horizontal means 18 along its horizontal path, head horizontal means 18 is connected to lead screw 100 by nut 102. Nut 102 is affixed to head horizontal means 18. Lead screw 100 is journaled in bearing 104 and is connected to shaft 106 of head position motor 36 by coupler 42. With this arrangement, as the shaft of head position motor 36 rotates, nut 102 travels along lead screw 100 thereby positioning head horizontal means 18.

Similarly, head stepping motor 28 has lead screw 108. Nut 110 is affixed to head arm 112 of head assembly 30 and is free to travel along lead screw 108. With this arrangement, head assembly 30 can travel along channel 92 in the direction of arrow 94. It should be noted that head stepping motor 28 positions head assembly 30, while head position motor 36 positions head horizontal means 18.

As mentioned, head vertical means 44 is a hollow wedge-shaped piece. Attached to the underside of head vertical means 44 is hollow cylinder 114 (See FIG. 2 and FIG. 3). The upper end of rod 118 is fitted into cylinder 114 while the lower end of rod 118 is supported by means 120. Channel 122 is cut on the bottom of support frame 12 as shown in FIG. 2 and support means 120 is positioned on tracks within channel 122 and travels horizontally in the direction of arrow 22. As was mentioned previously, head vertical means 44 has movement in a vertical and horizontal plane, i.e., along the direction of arrow 124 and along the direction of arrow 22. As head position motor 36 rotates in a clockwise direction, head horizontal means 18 travels in the direction of arrow 22 toward cartridge 34. The weight of head vertical means 44 loads onto head horizontal means 18 and is carried with head horizontal means 18 as held by ledge stop 96. As such, head vertical means 44 also travels toward cartridge 34. However, a stop (not shown) is positioned on the upper surface of support frame 12 and prevents head vertical means 44 from proceeding any further toward cartridge 34 while head horizontal means 18 is free to travel toward cartridge 34. The continued forward motion of head horizontal means 18 imparts vertical motion to head vertical means 44, i.e., motion in the direction of arrow 124. Since rod 118 is loosely fitted into cylinder 114, the vertical motion of head vertical means 44 is not impeded.

Referring now to FIG. 2, support means 120 is free to travel horizontally along channel 122. The horizontal movement is caused by head position motor 36. Bracket 126 is affixed to support means 120. Force solenoid 128 is supported by bracket 126. Tapered roller 60, hereinafter called second force means 60, is connected by shaft 128 at pivot points 130 and 132 to support means 120 and force solenoid 128, respectively. Second force means 60 applies pressure to the front edge of magnetic media 56 when force solenoid 128 is relatively heavily activated, so as to create frictional driving force between the back edge of magnetic media 56 and reel flange 202 so as to produce sequential transfer of tape between inner bale 134 and outer bale 136.

Figure 4:
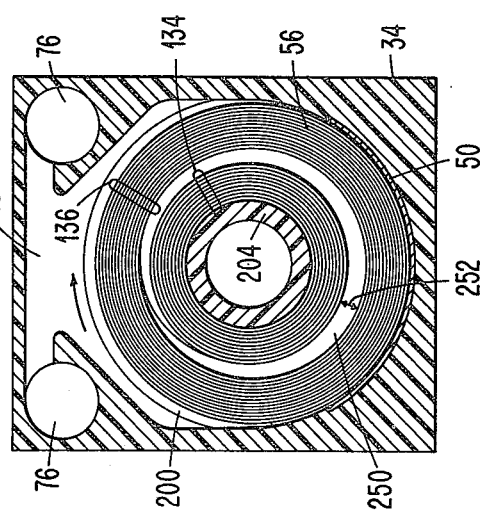
FIG. 4 is a break-away view of the cartridge showing the configuration of the tape on the reel in rapid access mode.

Referring now to FIG. 4 which is a conceptual representation of cartridge 34 with reel 200 when tape transport unit 10 is operating in the rapid access mode. In the rapid access mode, reel drive motor 84 is rotating drive hub 208 and hence reel 200 at maximum speed. The direction of rotation is either clockwise or counterclockwise depending upon the energization of reel drive motor 84. In the rapid access mode, a forward search to the end-of-tape or a backward search to the beginning-of-tape is accomplished in approximately 20 revolutions of reel 200. If this were done in the conventional manner, approximately 350 revolutions would be required. Tape transport unit 10 is a friction drive which accomplishes the rapid access mode by a differential path length difference between inner bale 134 and outer bale 136. In the rapid access mode, a force means (not shown), hereinafter called first force means, loads magnetic media 56 against frictional surface 50 which is located on one side of cartridge 34 as shown in FIG. 4. The first force means may be a light vacuum source or gravity. Likewise, frictional surface 50 may be any conventional material which is affixed to the inside of cartridge 34. In order to establish a fundamental band of tape to transfer from inner bale 134 to form outer bale 136, an endless loose belt 51 is positioned to encircle magnetic media 56. Stated another way, endless loose belt 51 is interposed between frictional surface 50 and the outermost layer of magnetic media 56. Although a variety of suitable materials may be used to fabricate the endless belt, in the preferred embodiment of this invention a polyethylene belt is used. With this configuration, one end of magnetic media 56 is attached to reel hub 200 while the other end is free. The free end of magnetic media 56 attaches itself to the inner surface of loose belt 51 for guidance. It should be noted that loose belt 51 is only one means by which a fundamental band of tape can be established from inner bale 134. It is within the skill of the art to design other means without departing from the scope or spirit of this invention. With the free end of magnetic media 56 attaches onto the inner surface of loose belt 51 and the outer surface of loose belt 51 is loaded onto frictional surface 50 and reel drive motor 54 rotating reel 200 in a clockwise direction, a layer of magnetic media will be transferred from the inner bale 134 to the outer bale 136 for each fraction of a revolution of reel 200. As rotation of reel 200 continues, several layers of magnetic media will be transferred thereby increasing outer bale 136 and decreasing inner bale 134. It should be noted that when reel 200 is rotated in a clockwise direction magnetic media 56 will transfer from inner bale 134 to outer bale 136. Conversely, when reel 200 rotates in a counterclockwise direction, magnetic media 56 is transferred from outer bale 136 to inner bale 134. As such, rapid access mode is effective for locating a desired address or rewinding the magnetic media. Thus, stating the rapid access feature in another way, whenever tape transport unit 10 is in the rapid access mode, for every rotation of reel 200 a plurality of layers, approximately 17 for the geometry described, of magnetic media 56 is transferred. As can be seen from FIG. 4, inner bale 134 is separated from outer bale 136 by space 250. The width 252 of space 250 is relatively constant as shown in FIG. 4. As reel hub 204 is rotated, layers of magnetic media 56 cross space 250 to either the outer bale or the inner bale (depending on the direction of rotation), as space 250 precesses inwardly toward reel hub 204 or outwardly away from reel hub 204. In this rapid access mode, tapered roller 60 applies a relatively light force to one edge of magnetic media 56 so as to hold the other edge of magnetic media 56 against reel flange 202 for proper guidance.

It should be noted that in order to effectuate rapid access mode, the following steps must be performed: (a) separating the magnetic media on reel 200 into inner bale 134 and outer bale 136, the outer bale 136 is constrained by a circumferential belt called loose belt 51 or other suitable means, (b) hold outer bale 136 stationary while rotating the inner bale. This maneuver will result in transferring layers of magnetic media from inner bale 134 to outer bale 136 or vice versa, (c) stop the inner bale 134 from rotating whenever a desired location is reached.

Tape transport unit 10 is a rapid access device which can locate information on reel 200 in a relatively minimum amount of time.

Referring to FIGS. 2 and 5, a conceptual representation of cartridge 34 with reel 200 is shown with tape transport unit 10 operating in the sequential mode. In the sequential mode, head 32 enters top cartridge opening 54 and is in contact with the outer surface of inner bale 134. In the sequential mode, head 32 is processing information, i.e., reading or writing data on the outer magnetic surface of inner bale 134. Reel drive motor 84 is rotating reel 200 at lower speed, i.e., for every clockwise revolution of reel 200, nearly one layer of magnetic media 56 is transferred from inner bale 134 to outer bale 136. Similarly, for every counterclockwise revolution of reel 200, nearly one layer of magnetic media 56 is transferred from outer bale 136 to inner bale 134. As such, the sequential mode is effective for the normal processing of data. In the sequential mode, inner bale 134 and outer bale 136 are driven by reel drive motor 84 as a single unit. A high vacuum is supplied to tapered-wall vacuum column 48 via vacuum chamber 76 and a vacuum inlet 74. The high vacuum pulls outer bale 136 in a radial direction into the tapered-wall vacuum column and away from the axis of reel 200. The high vacuum holds the portion of outer bale 136 which is in column 48 under tension. Due to the pulling force exerted by the high vacuum, outer bale 136 and its assicated loose belt 51 is removed or unloaded from interaction with friction surface 50. Also, space 250 is skewed to the side of cartridge 34 adjacent tapered-wall vacuum column 48 thereby allowing head 32 to enter top cartridge opening 54 into space 250 and read or write data on the outer magnetic surface of inner bale 134 in normal sequential mode. As can be seen from FIG. 5, one end of the magnetic media leaves the reel at position 252 and returns to the reel at position 254. Also, inner bale 134 and outer bale 136 merge into a single bale below points 252 and 254. This merger creates an interlayer frictional driving force between the layers of the magnetic media. Also, in the sequential mode, second force means 60 applies maximum tangential force to the edge of magnetic media 56 thereby increasing the frictional force between magnetic media 56 and the reel flange. The frictional forces created by the layers of the magnetic media and the edge of the magnetic media and the reel flange is the driving force that allows sequential transfer of magnetic layers when the system is operating in sequential mode.

Therefore, in order to process data sequentially, the following steps are necessary:

a. applying a force means to the outer bale so as to skew the space to one side of said reel;

b. applying a tangential force against one edge of the tape so as to force the other edge against the reel flange;

c. rotating the inner and outer bales as a unit thereby sequentially transferring tape layers from the inner to the outer bale, or vice versa;

d. inserting a magnetic transducer to process data on the magnetic surface of the tape.

For proper functioning of tape transport unit 10, means are provided for sensing when space 250 is formed so that head 32 can be inserted. Referring now to FIG. 2 and FIG. 3, window optical sensor 138 is shown sensing for the lower edge of space 250. Window optical sensor 138 is a sensor unit comprising fiber optics and a light source. The light source in the unit illuminates the edge of the inner bale 134 and is reflected from the edge of the tape layers. Whenever window optical sensor 138 is in line with space 250, the light is not reflected from the edge of the tape. Window optic sensor 138 has light-sensitive means which senses the absence of reflection and output signal signifying the fact that head assembly 30 is now in line with space 250. The output signal is used for controlling reel drive motor 84.

Referring again to FIG. 1, once it has been determined that head 32 is aligned with space 250, it has to be determined if any layer of magnetic media 56 is across the space. This is achieved by positioning light-illuminating source 140 on surface 90 of head vertical means 44. The light-illuminating source may be LED. Light-illuminating source 140 is so arranged that its beam will illuminate the inner surface of reel flange 202 when space 250 is clear, i.e., there is no layer of magnetic media across space 250. Sensor means 142 is so arranged to collect the reflected light only when the reflection is from the reel flange and output signal indicating that the space 250 is clear. However, if a layer of tape is across space 250, the layer of tape would obscure the light reflection; thus reflected light would not activate sensor means 142 and head 32 would not be inserted. Therefore, before head 32 is inserted in space 250, window optical sensor 138 must sense the edge of space 250 and sensor means 142 must sense that space 250 is clear. Head 32 is then loaded against the magnetic surface of magnetic media 56. In order for head 32 to maintain a constant force on the magnetic surface of magnetic media 56, head force transducer 144, hereinafter called head force means 144, is affixed to head assembly 30. Head force means 144 monitors the force on head 32 and generates a signal which controls head position motor 35 to reduce or increase the force by radial or vertical movement of head vertical means 44. The constant force ensures proper transducing relationship between head 32 and the nagnetic surface of the magnetic media 56.

Referring again to FIG. 1, identifying means is provided for determining the radius of the magnetic media which is on reel hub 204 in order to locate a desired address. As was previously mentioned, head horizontal means 18 has horizontal movement along frame support 12 in the direction of arrow 22. Also, head horizontal means 18 transfers its movement to head vertical means 44. However, as head horizontal means 18 and head vertical means 44 travel toward cartridge processing station 46, a point is reached where head vertical means 44 is restrained from forward movement. But, since head horizontal means 18 is still free to move forward, head vertical means 44 will move radially or vertically in the direction of arrow 124. It should be noted that head vertical means 44 is moving in the same radial direction as the magnetic media on reel hub 204. As such, there is a relationship between the linear distance traveled along support frame 12 by head horizontal means 18 and the radius of the nagnetic media on reel 200. The relationship is approximately a 3-to-1 ratio, i.e., for every three units that the head horizontal means 18 travels along support frame 12, the radius of the magnetic media on reel hub 204 increases one unit. Likewise, head vertical means 44 travels one unit in the direction of arrow 124. In order to determine the linear distance that head horizontal means 18 has traveled, a linear displacement transducer 150 is attached along frame 12. In one embodiment of the invention, a conventional linear tranSfromer was used. However, it will be obvious to those skilled in the art that any other conventional linear displacement transducer may be used. Thus, the identifying means is the linear displacement transducer together with head horizontal means 18 and head vertical means 44 which transform linear displacement into radial displacement. Stated another way, the identifying means is the linear displacement transducer together with a mechanical means which determines a radial measurement from linear displacement.

Figure 8:
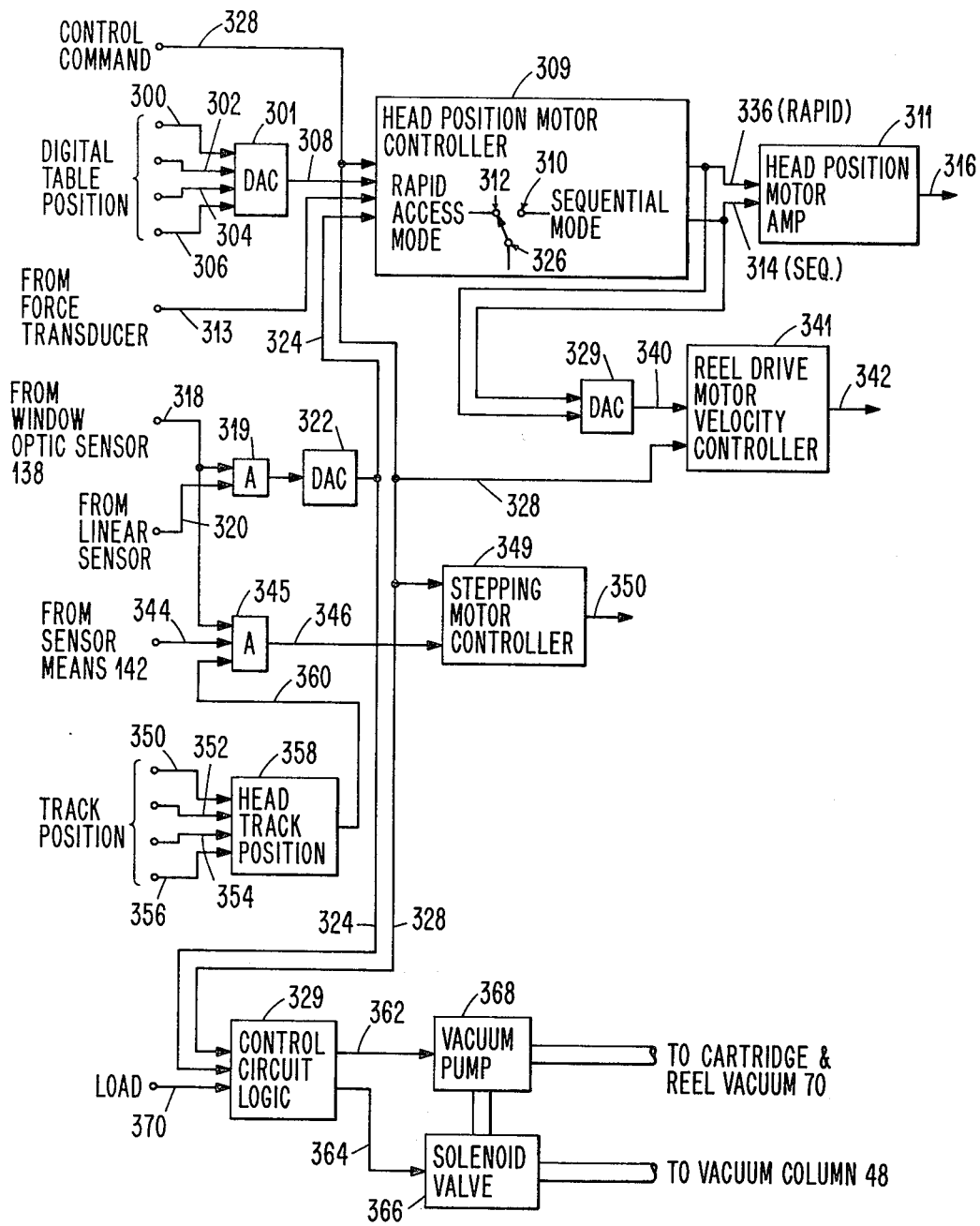
FIG. 8 shows a block diagram representation of an electric control means for the unit of FIG. 1.

An example, without limitation of an electrical system which may be utilized to control the tape transport unit disclosed in FIG. 1 is shown in FIG. 8. In this figure, reel drive motor velocity controller 341 outputs an electrical signal on terminal 342. The electrical signal on terminal 342 is used to energize reel drive motor 84. As was stated previously reel drive motor 84 drives or rotates reel 200 in either the rapid access mode or the sequential mode. Therefore, reel drive motor velocity controller 341 controls reel drive motor 84 to operate either in the rapid access mode or the sequential mode. D to A converter 329 receives electrical signals on terminals 314 and 336 respectively. The electrical signal on terminal 314 is the sequential mode signal while the electrical signal on terminal 336 is the rapid access mode signal. D to A converter 329 outputs a signal on terminal 340 which is fed into reel drive motor velocity controller 341. Additionally, reel drive motor velocity controller 341 is controlled by the control command signal on terminal 328.

Still referring to FIG. 8, head position motor controller 309 provides electrical signals which drive head position motor 36 so as to position head horizontal means 18 thereby enabling head 32 to access information on magnetic media 56. Head position motor controller 309 is comprised of dual pole electronic switch 326. Head position motor 36 is in the rapid access mode when switch 326 is connected to terminal 310 while head position motor 36 is in the sequential mode when switch 326 is connected to terminal 312. Window optic sensor 138 outputs a signal on terminal 318 when the lower edge of space 250 is located by the sensor. Likewise, the linear sensor outputs a signal on terminal 320. Signals 318 and 320 are applied to circuit means 319. The output from circuit means 319 is converted by D to A converter 322 and is applied to head position motor controller 309 via terminal 324. The signal on terminal 324 is used to change switch 326 on either position 310 or position 312. A control command is applied to terminal 328 and this signal is used for overall command of head position motor controller 309. When head position Motor 36 is operating in the sequential mode, head force transducer 144 outputs a signal on terminal 313 which controls switch 326. Similarly, when head position motor 36 is operating in the rapid access mode, D to A converter 301 outputs an electrical signal on terminal 308 which controls switch 326. As will be explained in the operational section the signal on terminal 308 is indicative of a desired reel address.

Still referring to FIG. 8, stepping motor controller 349 outputs a pulse on terminal 350 which activates stepping motor 28. When stepping motor 28 is activated, head assembly 30 is stepped in the direction of arrow 94 so that head 32 can access a desired address on magnetic media 56. Terminals 350, 352, 354 and 356 feed electrical signals into head track positioning circuitry 358 which outputs a signal on terminal 360 indicative of a desired track on magnetic media 56. Each of the signals on terminals 350, 352, 354 and 356 is indicative of a desired track since magnetic media 56 has a plurality of tracks. The signal on terminal 360 together with signals on terminals 318 and 344, respectively, is fed into circuit 345. The output of circuit 345 is a pulse which appears on terminal 346 and is used to activate stepping motor controller 349.

Finally, control circuit logic 329 outputs two control signals. One of the control signals appears on terminal 362 and is fed into vacuum pump 368. The other control signal appears on terminal 364 and is used to activate the solenoid valve 366 which controls the vacuum from vacuum pump 368 into vacuum inlet 74. When the signal on terminal 362 is up, vacuum is applied to vacuum chamber 72. Likewise, when the signal on terminal 364 is up, vacuum is applied to vacuum column 48. This completes the detailed description of the tape transport unit.

OPERATION

In operation cartridge 34 is seated on cartridge processing station 46. This cartridge may be seated by an operator or if the cartridge is part of a library system, a mechanical means will remove the cartridge from its location and seat the cartridge on processing station 46. As the cartridge is seated on processing station 46, vacuum is applied to vacuum ports 64 and 66. The vacuum which is applied to port 64 pulls cartridge 34 so that the back side is resting flush against reference plate 62. Simultaneously, vacuum is also applied to vacuum port 66. This vacuum pulls reel flange 202 in an axial direction so as to clear the back side of cartridge 34. The vacuum also releases latching means 210.

The system is now ready for operation. An operator sets up a desired address on an operator's panel (not shown) which is attached to tape transport unit 10. The address is entered into a conventional table look-up. This conventional table look-up transforms the reel address into linear position along frame support means 12. In other words, once an address has been entered, the table look-up means will transform the desired address into a linear measurement. The linear measurement is derived from the linear transducer which is located on frame 12. Table look-up means then outputs a digital table position on terminal 300–306 which is equivalent to the desired address. The digital table position signal is then fed into digital-analog-converter 301. A signal indicative of the desired address appears on terminal 308. A control command is then applied to terminal 328. Electronic switch 326 is then switched from its normal position to pole 312. Head position motor controller 309 then outputs a signal on terminal 336 indicating that the device is now in the rapid access mode. In the rapid access mode, reel drive motor 84 is rotating reel 200 at maximum speed.

Simultaneously, head position motor amplifier 311 is driving head position motor 36 so as to position head horizontal means 18 at a desired position along the linear transducer. As soon as window optic sensor 138 senses the lower edge of space 250 a signal is outputted on terminal 318. Likewise, as head horizontal means 18 reaches its desired location, a signal is outputted on terminal 320 from the linear transducer. The signal on terminal 318 and the signal on 320 is applied to AND block 319. The output from block 319 is then applied to digital-analog-converter 322 and a signal is outputted on terminal 324. The signal in terminal 324 switches electronic switch 326 from the rapid access mode to the sequential mode.

In the sequential mode, reel drive motor will rotate reel 200 at relatively lower speed. A signal is outputted on terminal 344 from sensor means 142 when the skewed space 250 is clear. A signal then appears on terminal 364. This signal activates solenoid valve 366 and the vacuum to vacuum column 48 is now on. The vacuum pulls outer bale 136 in a radial direction so as to skew space 250 to create a space adjacent vacuum column 48. Tapered roller 60 is activated providing the driving force required for sequential operation. Stepping motor controller 349 outputs a signal which activates stepping motor 28 and the head 32 is positioned into cartridge 34. It then loads up the force transducer against the outer magnetic surface of the inner bale 134. The force on head 32 is measured by force sensing means, force transducer 144 and a signal is outputted on terminal 313. The signal on terminal 313 is compared with a reference. If the signal on terminal 313 is greater than or is less than the reference, head position motor 36 will be activated to position head horizontal means 18. For example, if the signal on terminal 313 is less than the reference signal this is an indication that the force on head 32 is less than the force which is required for proper transducing between head 32 and the magnetic media 56. To correct this situation, head position motor 36 would rotate in a counterclockwise direction so as to transport head horizontal means 18 in a direction along arrow 22 and away from the front surface of cartridge 34. This maneuver increases the force on head 32. Similarly, if the signal on terminal 313 is greater than the reference signal, head position motor 36 will rotate in a clockwise direction so as to position head horizontal means 18 toward the front surface of cartridge 34. This maneuver will move head vertical means 44 in a vertical upward direction parallel to arrow 124 and relieve excess force on head 32.

When the force on head 32 is equivalent to a predetermined value, the reel 200 will turn at a predetermined rate. Head 32 will write or read data from magnetic media 56. Once the read/write operation is concluded, the force will be reduced and stepping motor 28 will be energized and head 32 will be removed from the cartridge. Cartridge 34 is then removed from the drive and stored as is or the magnetic media may be rewound to the beginning of tape before cartridge 34 is removed from the tape transport unit.

While the invention has been particularly shown and described with reference to a preferred embodiment thereof, it will be understood by those skilled in the art that various changes in form and details may be made therein without departing from the spirit and scope of the invention.

What is claimed is:

1. Single reel magnetic media unit apparatus, comprising:
    a stationary tapered-wall vacuum column positioned on one side of said reel,
    driving means operably connected for reversibly rotating said reel about its axis,
    a stationary friction surface positioned on the opposite side of said vacuum column,
    first force means operable for loading said magnetic media against the friction surface, whereupon rotation of said reel produces rapid transfer of tape layers from previously formed inner bale and outer bale, said inner and outer bales being separated by a space, and
    second force means operable for loading said magnetic media against a reel flange of said reel, whereupon rotation of said reel produces sequential transfer of tape layers between the inner and outer bales.

2. The single reel tape device as claimed in claim 1 further including:
    means for applying a vacuum to said tapered-wall vacuum column, thereby pulling the outer bale in a path radially displaced from the axis of said reel and skewing the space adjacent said vacuum column, and
    guide means operatively encircling said reel and positioned between said friction surface and the reel,
    said guide means being cooperative with said reel to establish a fundamental band of tape from the inner bale, and to thereby define the inner and outer bales.

3. The device as claimed in claim 1 wherein the first force means is gravity.

4. The device as claimed in claim 2 further including reading/writing means operably connected for accessing the space and for processing information on the tape's recording surface.

5. The device as claimed in claim 2 wherein the guide means includes an endlessly loose belt.

6. Single reel magnetic media unit apparatus, comprising:
    means including a magnetic media storage reel having magnetic media wound thereon so that the magnetic recording surface thereof being positioned away from the central axis of said reel,
    a stationary vacuum means positioned on one side of said reel for forming a skewed space so as to separate the magnetic medium on said reel,
    a stationary friction surface positioned on the opposite side of said reel for maintaining the outer bale stationary,
    drive means operably connected to said reel for reversibly rotating said reel about its axis,
    first force means operable for loading said reel against said friction surface such that rotation of said reel rapidly transfers layers of magnetic media,
    identifying means operable to identify a desired tape location whereupon said force means is controlled to relieve the loading of said reel against said friction surface, and
    a reading means operably associated with the space for processing information on the recording surface of said magnetic media.

7. The magnetic media as claimed in claim 6 further including:
    third force means operable for loading and supporting the recording surface of the magnetic media against the reading means so as to prevent unwanted separation between the magnetic media and the reading means.

8. The single reel device as claimed in claim 6 further including:
    second force means operable for applying a tangential force against one edge of the reel so as to load the other edge of said reel against the reel flange.

9. The single reel device as claimed in claim 8 wherein the second force means is a tapered pressure roller.

10. The device as claimed in claim 6 wherein the drive means comprises a reversible motor.

11. The device as claimed in claim 6 wherein the identifying means comprises:
    displacement means for sensing a linear measurement,
    mechanical means operatively associated with said displacement means for transforming the linear displacement into radial measurement.

12. The device as claimed in claim 6 wherein the reading means comprises:
    a hollow wedge-shaped head support means, having a guide channel in upper surface,
    a read head assembly cantilevered for moving along said guide channel,
    drive means, operably connected to said read assembly, having a positioning lead screw for positioning the read assembly relative to the magnetic surface for reading or writing data.

13. The device as claimed in claim 12 wherein the drive means includes a stepping motor.

14. The device as claimed in claim 12 wherein the read/write head assembly comprises:
    a magnetic transducer for inserting in the space relative to the magnetic surface for processing data,
    head force means operably affixed to said magnetic transducer for maintaining a predetermined force, and
    head arm operably connected to said magnetic transducer.

15. The device as claimed in claim 14 wherein the head force means includes a strain gauge.

16. The device as claimed in claim 6 further including sensing means for sensing the space between the layers of the tape.

17. The magnetic tape unit as defined in claim 6 further including:
    a reference plate, drive hub means operably connected with the reference plate for rotating said reel,
means associated with said drive hub means to facilitate mounting said reel thereon so that the reel cooperates with said drive hub means thereby enabling the tape's reel to rotate transferring tape layers as the space precesses through the reel.

18. The device as claimed in claim 17 wherein the means comprises a set of mating gears.

19. The device as claimed in claim 18 further including:
first force means for seating the reel firmly against the drive hub means,
second force means operable for seating the cartridge of said reel against the reference plate thereby enabling the cartridge to resist lateral movement as the reel rotates.

20. Single reel magnetic tape unit apparatus comprising:
a magnetic tape storage reel having magnetic media wound thereon,
a tape cartridge operably associated with said tape storage reel, said cartridge having a plurality of windows on one surface, and a tapered-wall vacuum column operably associated with said tape,
a stationary friction surface positioned on one side of said cartridge, and
drive means operably connected to the cartridge and for mounting said cartridge and tape storage reel to a tape drive.

21. The device as claimed in claim 20 wherein the openings are positioned on opposite sides of the reel's axis.

22. The apparatus as claimed in claim 21 wherein one of the openings is being used for inserting a read/write means so as to process information on the recording surface of said tape, and
another opening is being used for applying pressure to the tape's edge thereby assuring proper guidance.

23. A tape transport system, the combination comprising:
a single reel tape transport comprising;
a stationary, tapered-wall vacuum column positioned on one side of said reel,
a stationary friction surface positioned on the opposite side of said reel,
drive means operable connected to rotate said reel,
first force means operable to load said tape against said friction surface such that rotation of said reel produces rapid transfer of tape layers to form a void adjacent said vacuum column,
second force means operable to load said tape against the reel's flange such that rotation of said reel produces sequential transfer of tape layers,
means operable to identify a desired tape location, whereupon said first force means is controlled to relieve the loading of said tape against said friction surface, and
a head is inserted in cooperation with the inner tape layers of said space thereby processing information as tape layers are sequentially transferred.

24. Single reel magnetic tape unit comprising:
a tapered-wall cartridge having a plurality of windows on one surface,
a magnetic tape storage reel operable connected to said cartridge, said storage reel having magnetic media wound thereon,
a friction surface affixed to said cartridge and positioned opposite to the tapered wall,
locking means operable connected to the cartridge and the storage latch for locking said reel in stationary position when the cartridge is removed from the tape transport unit.

25. The device as claimed in claim 24 wherein the locking means includes:
a magnet and keeper.

26. A tape transport system, the combination comprising:
a support frame,
a tape drive means operably connected to said support frame for reversibly rotating a tape reel,
a tape cartridge having a tapered-shaped vacuum column and magnetic tape reel, operably connected to said tape drive means,
means operably connected for applying a vacuum to said tapered-shaped vacuum column,
reading/writing means operable for accessing information on said magnetic tape reel,
drive means operably connected for positioning said reading/writing means in a horizontal plane,
drive means operably connected for positioning the reading/writing means in a vertical plane.

27. The combination as claimed in claim 26 further including means for applying pressure to the edge of the tape reel thereby ensuring sequential transfer of tape layer.

28. The combination as claimed in claim 27 further including sensing means operably connected to the reading/writing means for sensing a void positioned within the layers of the tape on said reel, whereby a transducing means is inserted in said void to process data on the tape.

29. The combination as claimed in claim 28 wherein the sensing means is a fiber optics unit.

30. An improved method of accessing a single-spool tape reel comprising the steps of:
separating the tape on the reel with a space so as to form an inner and an outer bale,
holding the outer bale of tape stationary,
simultaneously rotating the inner bale in a first direction thereby rapidly transferring tape layers from the inner bale to the outer bale as the space precesses toward the reel hub, and
stopping rotation of the inner bale when a predetermined tape address is located.

31. The method as claimed in claim 30 wherein the inner bale is rotated in a second direction thereby rapidly transferring tape layers from the outer bale to the inner bale as the space precesses away from the reel hub.

32. An improved method of accessing a single-spool tape reel comprising the steps of:
separating the tape on the reel with a space so as to form an inner and an outer bale,
applying a first force to said outer bale so as to skew the void towards one side of said reel,
applying a tangential force against the tapes edge so as to force the other edge against the reel flange,
rotating the inner and outer bales as a unit thereby sequentially transferring tape layers from the inner to the outer bale.

33. The method as claimed in claim 32 further including the steps of:
inserting a read/write head into the skewed space so as to process information on the outer magnetic layer of the inner bale.

* * * * *